US006463732B2

United States Patent
Baeuerle et al.

(10) Patent No.: US 6,463,732 B2
(45) Date of Patent: Oct. 15, 2002

(54) METHOD AND ARRANGEMENT FOR CHECKING CATALYTIC CONVERTER HEATING MEASURES IN AN INTERNAL COMBUSTION ENGINE

(75) Inventors: Michael Baeuerle, Markgroeningen; Klaus Ries-Mueller, Bad Rappenau, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/871,685

(22) Filed: Jun. 4, 2001

(65) Prior Publication Data

US 2002/0000087 A1 Jan. 3, 2002

(30) Foreign Application Priority Data

Jun. 30, 2000 (DE) .......................................... 100 31 924

(51) Int. Cl.$^7$ ................................................. F01N 3/00
(52) U.S. Cl. ............................. 60/274; 60/277; 60/286; 60/289
(58) Field of Search ........................ 60/274, 276, 277, 60/275, 280, 287, 289, 298, 285, 286

(56) References Cited

U.S. PATENT DOCUMENTS

| | | | |
|---|---|---|---|
| 5,675,967 A | | 10/1997 | Ries-Müller |
| 5,860,277 A | * | 1/1999 | Schnaibel et al. ............. 60/274 |
| 5,930,993 A | * | 8/1999 | Kammann et al. ............. 60/274 |
| 5,938,715 A | * | 8/1999 | Zhang et al. ................ 701/109 |
| 6,119,448 A | * | 9/2000 | Emmerling et al. ........... 60/274 |
| 6,145,302 A | * | 11/2000 | Zhang et al. .................. 60/274 |
| 6,202,406 B1 | * | 3/2001 | Griffin et al. .................. 60/274 |
| 6,253,545 B1 | * | 7/2001 | Suzuki ......................... 60/278 |

FOREIGN PATENT DOCUMENTS

EP    0 937 869    8/1999

* cited by examiner

Primary Examiner—Thomas Denion
Assistant Examiner—Binh Tran
(74) Attorney, Agent, or Firm—Walter Ottesen

(57) ABSTRACT

A method checks the effectiveness of at least one measure (M) for heating a catalytic converter in the exhaust-gas system of an internal combustion engine. A measure (M) is activated and a signal (SA) in the exhaust-gas system of the engine is detected. The signal (SA) is evaluated to determine an index (Tact) for an increase in temperature of the catalytic converter after activating the measure (M). An expectation value (Tmodel) is determined for the increase of the temperature from operating characteristic variables of the engine and a temperature model. The index (Tact) is compared to the expectation value (Tmodel). The measure (M) is evaluated as ineffective when the index (Tact) is clearly less than the expectation value (Tmodel) with the expectation value (Tmodel) having been formed under the expectation of an effective heating measure. Or, a heating measure is evaluated as being ineffective when the index (Tact) is not clearly less than the expectation value (Tmodel) with the expectation value (Tmodel) having been formed under the assumption of an ineffective heating measure.

10 Claims, 3 Drawing Sheets

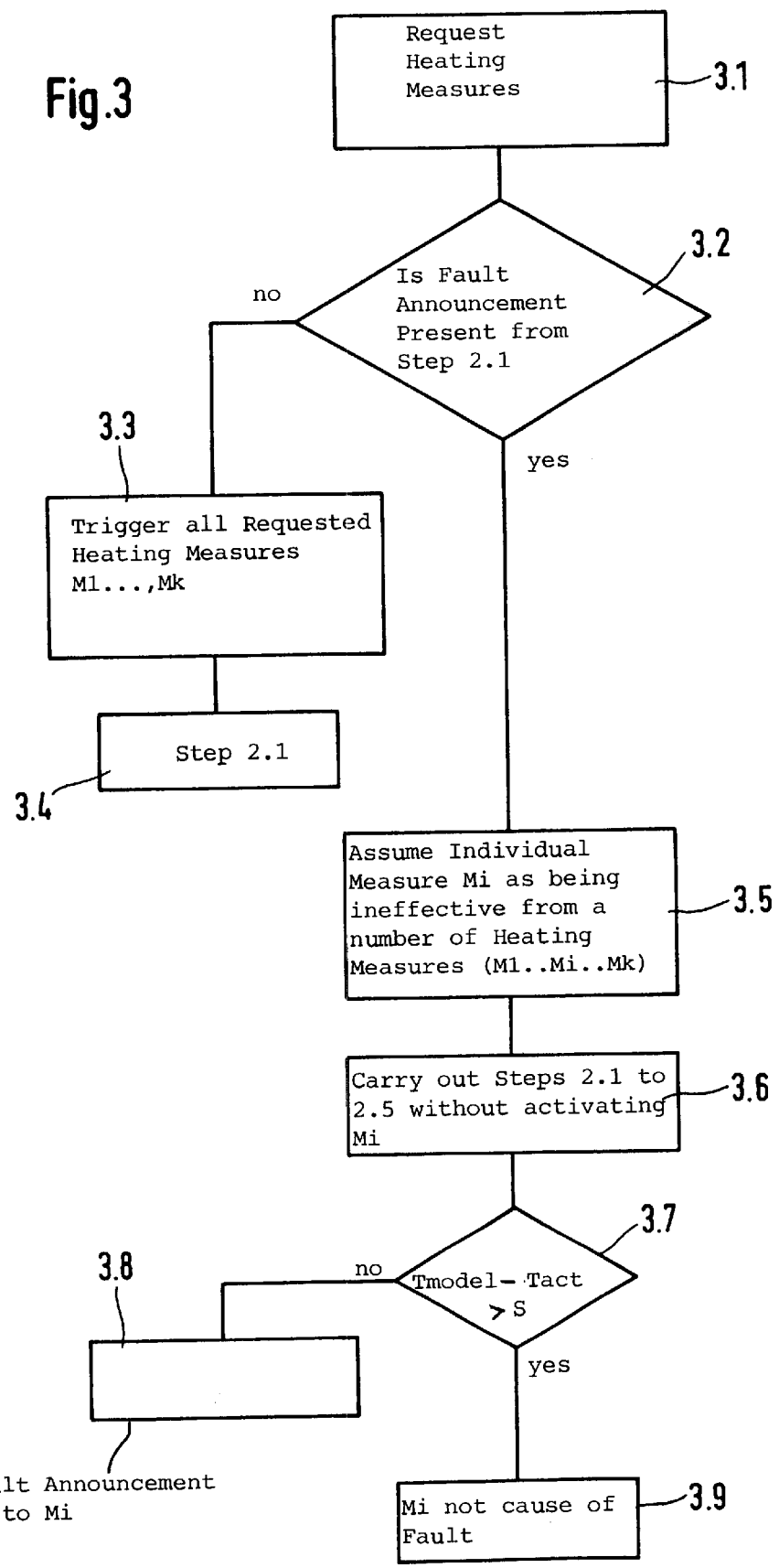

METHOD AND ARRANGEMENT FOR CHECKING CATALYTIC CONVERTER HEATING MEASURES IN AN INTERNAL COMBUSTION ENGINE

FIELD OF THE INVENTION

The invention relates to a method and an arrangement for checking the effectiveness of measures for heating a catalytic converter in the exhaust gas of an internal combustion engine.

BACKGROUND OF THE INVENTION

A rapid attainment and maintaining of the operating temperature of a catalytic converter is required in the interest of an optimal conversion of toxic constituents in the exhaust gas of an internal combustion engine.

Various measures are known for accelerated heating of the catalytic converter. Examples are: an increase of the exhaust-gas temperature by retarded ignition; a mixture enrichment in combination with blowing in secondary air; and, the use of a glow plug in the exhaust-gas system forward of the catalytic converter. This glow plug is intended to ignite and maintain the reaction of the secondary air, which is blown in rearward of the outlet valves of the engine, with the hydrocarbon constituents in the exhaust gas. The charge pressure control valve can be opened for a rapid warming of the catalytic converter in engines having exhaust-gas turbocharging and a charge pressure control valve. This clearly effects an earlier start of the toxic substance conversion in the catalytic converter, especially in combination with secondary air operation. This effect results from the situation that, for an opened pressure control valve, the exhaust gas is guided, to a certain extent, past the turbocharger. For this reason, hardly any energy is converted in the turbine of the turbocharger and the reaction of hydrocarbons and secondary air can take place undisturbed up to the catalytic converter via the open pressure control valve. Stated otherwise, an extinguishment of the secondary air flame in the chambers of the turbine wheel of the turbocharger does not take place.

An exhaust-gas system having an exhaust-gas flap and a cooling loop is known from European patent publication 0,937,869. In such an arrangement, the cooling loop can be closed for a cold engine or for a cold catalytic converter with an exhaust-gas flap or can be short circuited so that exhaust gas can no longer flow through the catalytic converter. This facilitates a rapid heating of the catalytic converter. At a higher exhaust-gas temperature, there is a flow through the cooling loop to cool the exhaust gas.

These measures for accelerated heating of the catalytic converter thereby influence the quality of the exhaust gas. Because of statutory requirements, the effectiveness of these measures has to be checked in motor vehicles having on-board means.

SUMMARY OF THE INVENTION

The invention defines a teaching for checking the effectiveness of the above measures.

More specifically, it is an object of the invention to provide a method of checking the effectiveness of at least one of the measures M for heating a catalytic converter in the exhaust gas of an internal combustion engine.

In the method of the invention, an index Tact for the temperature increase of the catalytic converter after activating at least one measure is determined by evaluating at least one signal SA which is detected in the exhaust-gas system of the engine; an expectation value Tmodel is determined for the increase of the temperature of the catalytic converter at least from operating characteristic variables of the engine and a temperature model; and, the index Tact is compared to the expectation value Tmodel and wherein at least a heating measure is taken as ineffective when Tact is clearly less than Tmodel and Tmodel was formed under the assumption of an effective heating measure or wherein at least one heating measure is judged to be ineffective when Tact is not clearly less than Tmodel and Tmodel was formed under the assumption of an ineffective heating measure.

The arrangement of the invention is for checking the effectiveness of at least one measure (M) for heating a catalytic converter in the exhaust-gas system of an internal combustion engine. The arrangement includes: means for activating the at least one measure (M); means for detecting a signal (SA) in the exhaust-gas system of the engine; means for evaluating the signal (SA) to determine an index (Tact) for an increase in temperature of the catalytic converter after activating the at least one measure (M); means for detecting operating characteristic variables of the engine; the evaluating means including means for determining an expectation value (Tmodel) for the increase in the temperature from the operating characteristic variables of the engine and a temperature model; the evaluating means also including means for comparing the index (Tact) to the expectation value and for evaluating the measure (M) as ineffective when the index (Tact) is clearly less than the expectation value (Tmodel) with the expectation value (Tmodel) having been formed under the expectation of an effective heating measure or, evaluating at least one heating measure as being ineffective when the index (Tact) is not clearly less than the expectation value (Tmodel) with the expectation value (Tmodel) having been formed under the assumption of an ineffective heating measure.

It is especially advantageous that the invention disclosed herein is not limited to a diagnosis of individual components but provides a complete system diagnosis.

Making the signal SA available via a temperature sensor affords the advantage of a precise detection of the catalytic converter temperature and this fact has positive effects on the reliability of the method.

The alternative formation of the signal SA from a signal as to the convertibility of the catalytic converter affords the advantage that a temperature sensor is not needed. The start of the conversion capability, which begins with increasing catalytic converter temperature, is determined and a conversion start, a specific temperature value, is assigned to the start of the conversion capability. Means for determining the conversion capability and therefore the conversion start are already available in modern motor vehicles. Methods for determining the conversion start are, for example, known from U.S. Pat. No. 5,675,967 which is incorporated herein by reference. The methods disclosed in this patent for determining the conversion start are included in the present disclosure.

An evaluation of the increase of the temperature can take place after a cold start or during a warm-up phase in the remaining operation. It is advantageous that the diagnosis is not limited to operating points which seldom occur but is instead, for example, possible in each operating cycle after a cold start.

Furthermore, the invention permits the ineffective heating measures to be identified with the aid of at least one further heat-up phase when several heating measures are used in parallel and the ineffectiveness of at least one heating measure is determined in a first heat-up phase. Here, the heating measure, which is assumed to be ineffective, is not activated and is identified in fact as ineffective when the actual temperature, which is determined in the further heat-up phase, is within a tolerance window to the actual temperature Tact determined in the first heat-up phase.

The use of the method is especially advantageous for the diagnosis of a glow device in the exhaust gas with the glow device being driven as part of a heating measure.

The advantage results from the situation that the glow device (for example, a glow device realized as a PTC resistance) is connected electrically in parallel to the secondary air pump. This situation makes an electrical diagnosis of the glow plug as an individual component difficult.

A similar advantage results in the use for diagnosing a charge pressure control valve in internal combustion engines having exhaust-gas turbocharging wherein the charge pressure control valve is driven as part of a heating measure.

BRIEF DESCRIPTION OF THE DRAWINGS

The invention will now be described with reference to the drawings wherein.

DESCRIPTION OF THE PREFERRED EMBODIMENTS OF THE INVENTION

Figure 1A:
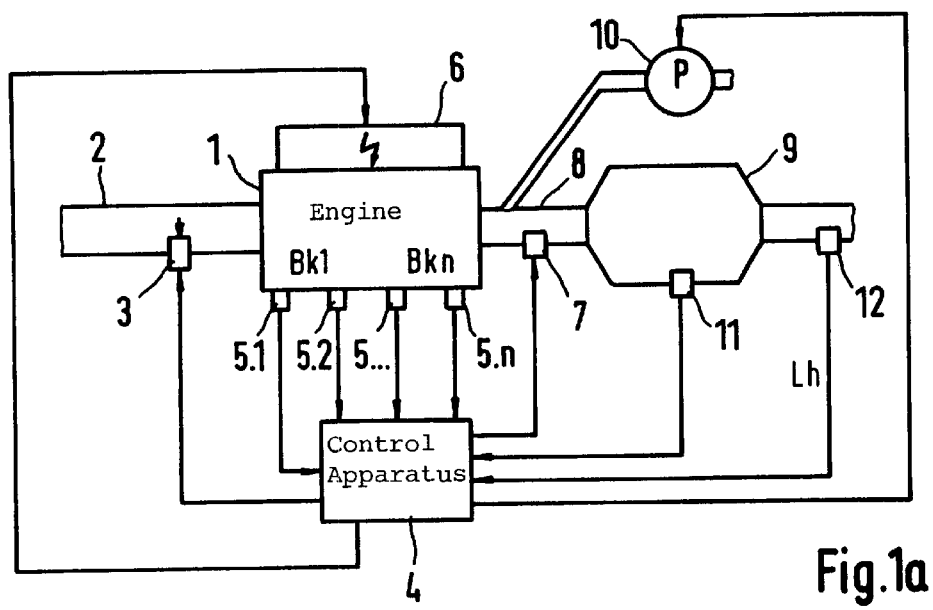
FIG. 1a is a schematic of an internal combustion engine equipped with a catalytic converter with which the method of the invention operates.

In FIG. 1a, an internal combustion engine 1 is supplied with an air/fuel mixture from an intake manifold 2. The fuel is metered via injection valves 3 in a quantity which is determined by the control apparatus 4 from operating characteristic variables Bk1 . . . Bkn. These operating characteristic variables are supplied by sensors 5.1 to 5.n. Examples of operating characteristic variables are: rpm, cooling water temperature, inducted air quantity, and inducted air temperature, et cetera. The vehicle speed v can also be processed as an operating characteristic variable. In spark-ignition engines, the control apparatus controls the ignition device 6 in order to initiate the combustion in the cylinders of the engine at respective desired time points. The ignition device is shown here because an adjustment of the ignition time point in the direction of retard defines a possible measure for the catalytic converter heating in spark-ignition engines.

The invention is, however, not limited to the application to spark-ignition engines in the context of other measures for heating a catalytic converter. Rather, the invention can also be used in diesel engines equipped with catalytic converters.

Reference numeral 7 identifies a glow plug in an exhaust-gas system 8 upstream of a catalytic converter 9. Reference numeral 10 identifies a secondary air pump and 11 identifies a temperature sensor in the catalytic converter. Reference numeral 12 represents an exhaust-gas sensor. The signal Lh of this sensor permits a determination of the start of the conversion which begins in the catalytic converter with increasing temperature. This is shown in FIG. 1c which shows the signal Lh as a function of temperature T of the catalytic converter. At initially low temperatures, the signal Lh fluctuates rather intensely because it is not yet influenced by the catalytic converter. As soon as the catalytic converter has reached the conversion start temperature TKB, the catalytic converter operates attenuatingly on the signal Lh. In control apparatus 4, this change in the signal Lh can be assigned to a stored predetermined temperature. In this way, this predetermined temperature can be determined from the signal Lh. Other methods for determining the temperature of the conversion start are described in the above-mentioned U.S. Pat. No. 5,675,967 incorporated herein by reference.

Figure 1B:
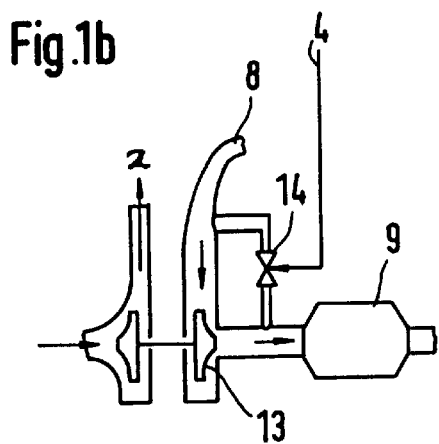
FIG. 1b is a schematic of a turbocharger with which the method of the invention operates.
Figure 1C:
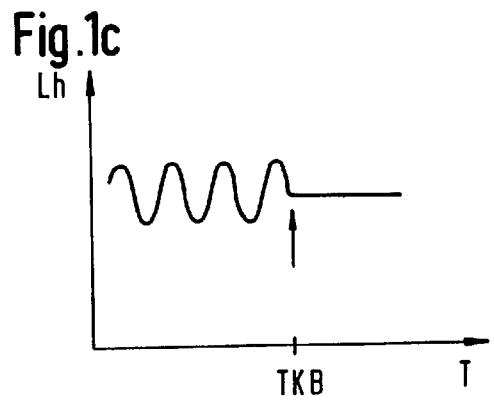
FIG. 1c shows a graph of the signal of an exhaust-gas sensor plotted as a function of the temperature of the catalytic converter.

FIG. 1b shows the technical background of an advantageous application of the invention. A turbocharger 13 includes a charge pressure control valve 14 realized as a bypass to the turbine vane wheel. The charge pressure control valve 14 is actuated by the control apparatus 4.

Figure 1D:
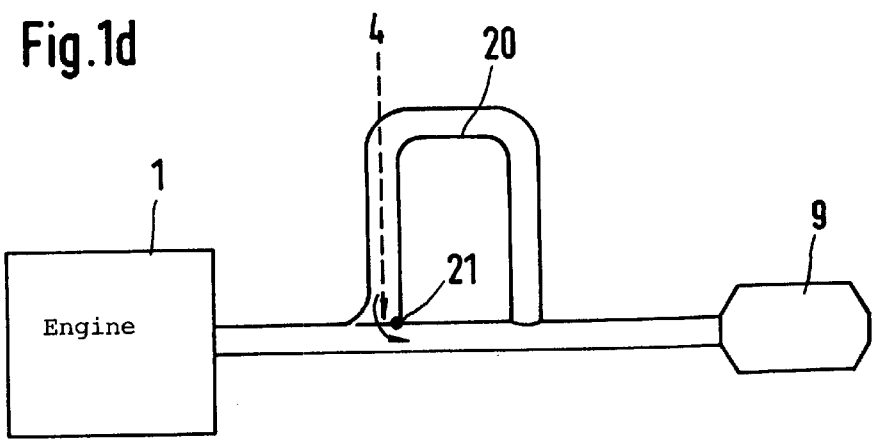
FIG. 1d shows the structure of a cooling loop in the exhaust gas mounted between the engine and the catalytic converter.

FIG. 1d shows the structure of a cooling loop 20 in the exhaust gas between engine 1 and catalytic converter 9 and the throughflow of the cooling loop 20 can be controlled by an exhaust-gas flap 21. In the position of the exhaust-gas flap shown, there is no flow through the cooling loop which facilitates the heating of the catalytic converter.

Figure 2:
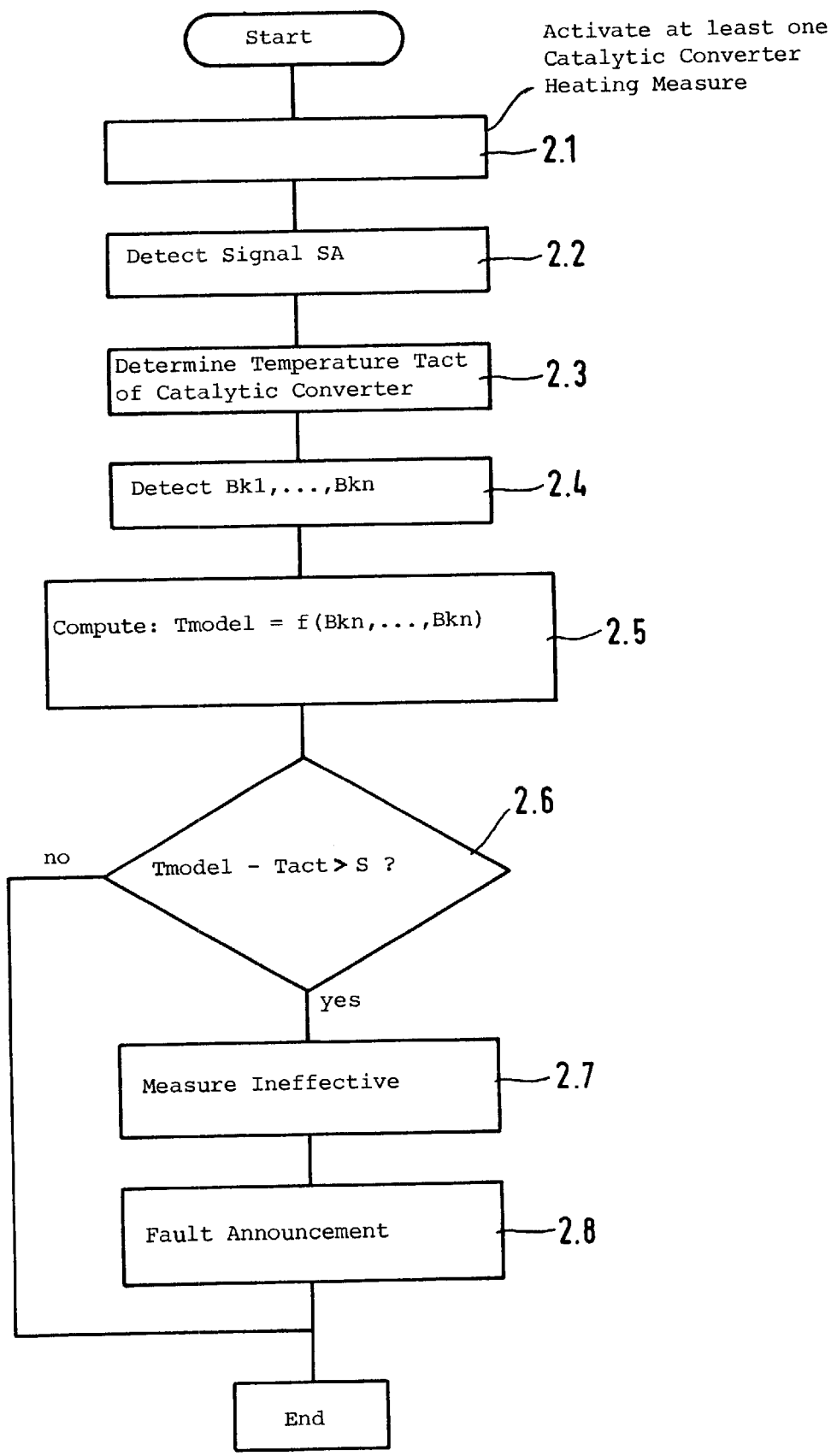
FIG. 2 shows an embodiment of the method of the invention in the context of a flow diagram; and, FIG. 3 shows a supplement of the method of FIG. 2 as an embodiment of an advantageous further development of the invention for identifying a defect.

FIG. 2 shows an embodiment of the invention in the context of a flow diagram. After a start, in step 2.1, the activation of at least one catalytic converter heating measure M takes place. For example, secondary air pump 10 and glow plug 7 are switched on and, because of a deterioration of the efficiency (retarded ignition) of the engine, uncombusted fuel is made available in the exhaust gas.

In step 2.2, the detection of a signal SA takes place in the exhaust-gas system of the engine and, in step 2.3, the temperature Tact of the catalytic converter is determined therefrom. In the simplest case, the signal SA directly represents the signal of a temperature sensor 11. In the case of cold start, the catalytic converter temperature can be used directly as a measure for the increase because the value of the start temperature (for example, 20° C.) can be neglected in comparison to the catalytic converter operating temperatures of several 100° C.

Step 2.4 serves to detect operating characteristic variables such as Bk1 . . . Bkn of the engine. In step 2.5, a model temperature Tmodel of the catalytic converter is computed from these operating characteristic variables. The basic computation model includes relevant dependencies of the catalytic converter temperature, for example, the dependency on the rpm, the intake air quantity and/or the intake air temperature, the ignition angle, the mixture composition lambda L, the supply of secondary air, the vehicle speed v, et cetera. Furthermore, one preferably proceeds from the effectiveness of the catalytic converter heating measures when the model is configured.

In step 2.6, a comparison takes place of the computed model temperature Tmodel to the specific actual temperature Tact. For example, the difference of both values is compared to a threshold value S.

When the model temperature Tmodel clearly drops below the actual temperature Tact, the difference Tmodel less Tact is greater than a correspondingly dimensioned threshold value S.

Exceeding the threshold value in step 2.6 shows that a necessary condition precedent for a correct temperature modeling is not satisfied. In step 2.7, it is assumed that the model precondition is not satisfied because of the ineffectiveness of the heating measure M. Correspondingly, a fault announcement takes place in step 2.8.

If, in step 2.1, only a single measure was activated for catalytic converter heating, then a fault announcement in step 2.8 refers clearly to this individual measure.

However, if in step 2.1, a bundle of measures was activated, then a fault announcement in step 2.8 cannot perforce be assigned to a specific individual measure. There is an interest in identifying the defective measure.

FIG. 3 shows a supplement to the method of FIG. 2 as an embodiment of an advantageous further development of the invention to identify the ineffective measure M.

Heating measures are requested in step 3.1. This can be the case after a cold start as shown in the embodiment of FIG. 2. Heating measures can, however, also be necessary during operation in order to again bring a cooled catalytic converter to its operating temperature or in order to hold the catalytic converter at its operating temperature. The cooling can occur, for example, in long downhill travel with phases of overrun operation wherein the fuel metering is switched off. It is understood that this applies also for the triggering of an individual heating measure.

In step 3.2, an inquiry takes place as to whether a fault announcement is already present from step 2.8 of FIG. 2. Such a fault announcement can originate from a previous driving cycle. The fault announcement can also originate from a previous heating phase with a check within the actual driving cycle.

If no fault announcement is present, all requested heating measures M1, . . . mi, . . . Mk are triggered in step 3.3. As a further method in this case, the step 2.1 from FIG. 2 follows. Stated otherwise, when no fault announcement is present, the normal check in accordance with FIG. 2 takes place.

If, in contrast, a fault announcement is already present, the inquiry in step 3.2 is answered in the affirmative and, a step sequence is processed for identifying the ineffective measure (ineffective because of a defect). For this purpose, an individual measure Mi is assumed in step 3.5 as being ineffective from the number of heating measures M1, . . . Mi, . . . Mk.

In step 3.6, the steps 2.1 to 2.5 from FIG. 2 are carried out without activation of Mi. The non-activation of Mi is, at least in this example, also considered in the computation of the model temperature Tmodel.

If there is again a clear deviation of the actual temperature Tact and the model temperature Tmodel, this is determined in step 3.7 and the determination takes place in step 3.9 that Mi cannot or at least cannot alone be the cause of the deviation.

If, in contrast, a reduced deviation results, this indicates that the measure Mi was already ineffective in the earlier check. Correspondingly, in step 3.8, a fault announcement takes place which is directed especially to Mi. This can also take place by the activation of a fault lamp or, for example, by supplementing the already stored assumption.

Alternatively to the assumed ineffectiveness of the measure Mi in the computation of the model temperature Tmodel, the computation of the model temperature Tmodel can also take place unchanged. This means that, for the computation, an effectiveness of the measure Mi continues to be assumed. Step 3.7 is modified for this case. If the actual temperature Tact, which is determined in the second heat-up phase, remains within a tolerance window to the actual temperature Tact determined in the first heat-up phase, a conclusion can be drawn as to the ineffectiveness of the non-activated heating measure.

It is understood that the foregoing description is that of the preferred embodiments of the invention and that various changes and modifications may be made thereto without departing from the spirit and scope of the invention as defined in the appended claims.

What is claimed is:

1. A method for checking the effectiveness of at least one measure (M) for heating a catalytic converter in the exhaust gas system of an internal combustion engine, the method comprising the steps of:

activating said at least one measure (M) to initiate said heating of said catalytic converter;

detecting a signal (SA) in said exhaust gas system of said engine;

evaluating said signal (SA) to determine an index (Tact) for an increase in temperature of said catalytic converter after activating said at least one measure (M);

determining an expectation value (Tmodel) for the increase of said temperature from operating characteristic variables of said engine and a temperature model;

comparing said index (Tact) to said expectation value (Tmodel);

evaluating said measure (M) for initiating said heating of said catalytic converter as ineffective when said index (Tact) is clearly less than said expectation value (Tmodel) with said expectation value (Tmodel) having been formed under the expectation of an effective heating measure; or, evaluating said measure (M) for initiating said heating of said catalytic converter as being ineffective when said index (Tact) is not clearly less than said expectation value (Tmodel) with said expectation value (Tmodel) having been formed under the assumption of an ineffective heating measure.

2. The method of claim 1, wherein said signal (SA) is provided by a temperature sensor.

3. The method of claim 1, comprising the further steps of:

forming said signal (SA) from a signal as to the capability of conversion of said catalytic converter;

determining the start of said conversion with the start becoming effective with increasing temperature of said catalytic converter; and, assigning a predetermined temperature value to said start.

4. The method of claim 1, comprising the further step of evaluating the increase in said temperature after a cold start or during a warm-up phase during the subsequent operation of said engine.

5. The method of claim 1, comprising the further steps of:

applying several heating measures in parallel and determining the ineffectiveness of at least one of said heating measures in a first warm-up phase;

determining the actual temperature in said first warm-up phase;

identifying the ineffective heating measure with the aid of at least one further warm-up phase while not activating the measure assumed to be ineffective;

determining the actual temperature in said further warm-up phase; and, identifying the heating measure assumed to be ineffective as the heating measure which is indeed ineffective when said actual temperature determined in said further warm-up phase is within a tolerance window relative to the actual temperature determined in said first warm-up phase.

6. The method of claim 5, wherein the method is applied to diagnose a glow device in said exhaust-gas system with the glow device being part of a heating measure.

7. The method of claim 5, wherein said engine has an exhaust-gas turbocharger having a charge pressure control valve; and, wherein the method is applied to diagnose said charge pressure control valve with the charge pressure control valve being part of a heating measure.

8. The method of claim 5, wherein said exhaust-gas system has a cooling loop and an exhaust-gas flap for determining the throughflow of exhaust gas through said cooling loop; and, wherein the method is applied to diagnose said exhaust-gas flap with said exhaust-gas flap being part of a heating measure.

9. The method of claim 1, wherein said at least one measure (M) includes switching on a secondary air pump and a glow plug disposed in said exhaust gas system.

10. An arrangement for checking the effectiveness of at least one measure (M) for heating a catalytic converter in the exhaust-gas system of an internal combustion engine, the arrangement comprising:

means for activating said at least one measure (M) for initiating said heating of said catalytic converter;

means for detecting a signal (SA) in said exhaust-gas system of said engine;

means for evaluating said signal (SA) to determine an index (Tact) for an increase in temperature of said catalytic converter after activating said at least one measure (M) for initiating said heating of said catalytic converter;

means for detecting operating characteristic variables of said engine;

said evaluating means including means for determining an expectation value (Tmodel) for the increase in said temperature from said operating characteristic variables of said engine and a temperature model;

said evaluating means also including means for comparing said index (Tact) to said expectation value and for evaluating said measure (M) for initiating said heating of said catalytic converter as ineffective when said index (Tact) is clearly less than said expectation value (Tmodel) with said expectation value (Tmodel) having been formed under the expectation of an effective heating measure or, evaluating said measure (M) for initiating said heating of said catalytic converter as being ineffective when said index (Tact) is not clearly less than said expectation value (Tmodel) with said expectation value (Tmodel) having been formed under the assumption of an ineffective heating measure.

* * * * *